US012703047B2

(12) United States Patent
Najafi et al.

(10) Patent No.: US 12,703,047 B2
(45) Date of Patent: Aug. 11, 2026

(54) METHOD TO PRODUCE HIGH CORROSION AND WEAR RESISTANT CAST IRON COMPONENTS BY USING LASER CLADDING

(71) Applicant: OERLIKON SURFACE SOLUTIONS AG, PFÄFFIKON, Pfäffikon (CH)

(72) Inventors: Hossein Najafi, Anglikon (CH); Franco Arosio, Bad Saeckingen (DE); Arkadi Zikin, Wohlen (CH); Rolf Heinecke, Baddeckenstedt (DE)

(73) Assignee: OERLIKON SURFACE SOLUTIONS AG, PFÄFFIKON, Pfäffikon (CH)

( * ) Notice: Subject to any disclaimer, the term of this patent is extended or adjusted under 35 U.S.C. 154(b) by 740 days.

(21) Appl. No.: 18/003,988

(22) PCT Filed: Jul. 2, 2021

(86) PCT No.: PCT/EP2021/068410

§ 371 (c)(1),
(2) Date: Dec. 30, 2022

(87) PCT Pub. No.: WO2022/003189

PCT Pub. Date: Jan. 6, 2022

(65) Prior Publication Data

US 2023/0256544 A1 Aug. 17, 2023

Related U.S. Application Data

(60) Provisional application No. 63/047,429, filed on Jul. 2, 2020.

(51) Int. Cl.
*B23K 26/342* (2014.01)
*B23K 26/60* (2014.01)
(Continued)

(52) U.S. Cl.
CPC ............ *B23K 26/342* (2015.10); *B23K 26/60* (2015.10); *F16D 65/0025* (2013.01);
(Continued)

(58) Field of Classification Search
CPC .... B23K 2103/04; B23K 26/32; B23K 26/34; B23K 26/342; B23K 2101/006;
(Continued)

(56) References Cited

U.S. PATENT DOCUMENTS

2009/0151163 A1* 6/2009 Kawasaki ............ B23K 26/342 29/888.06
2015/0315714 A1* 11/2015 Vijay ...................... B08B 3/024 204/229.4

(Continued)

FOREIGN PATENT DOCUMENTS

DE 102010048075 A1 4/2012
EP 0753599 A1 1/1997

(Continued)

OTHER PUBLICATIONS

International Search Report & Written Opinion for PCT Application No. PCT/EP2021/068410, mailed Nov. 9, 2021; 9 pages.

*Primary Examiner* — Chris Q Liu

(57) ABSTRACT

A method to produce a wear and corrosion resistant coating system onto a surface of a substrate, preferably a brake disc, comprising the following steps:

(1) providing the substrate having the surface made of an iron-based material or a steel material,
(2) selecting a dedicated material for producing one or more coating layers of the coating system,
(3) producing onto the substrate surface one or more coating layers of the coating system by using a laser cladding process, wherein the dedicated material selected in step (2) is used as source material for the production of the coating layers, and positioning a laser (Continued)

3a)

3b)

3c)

3d)

beam with respect to the substrate surface in such a manner that a coating angle is formed between the laser beam and the substrate surface, and maintaining this coating angle during the production of the one or more coating layers at a value between 10° and 30°.

13 Claims, 7 Drawing Sheets

(51) Int. Cl.

| | |
|---|---|
| ***B23K 101/34*** | (2006.01) |
| ***B23K 103/02*** | (2006.01) |
| ***B23K 103/04*** | (2006.01) |
| ***F16D 65/00*** | (2006.01) |
| *C21D 1/06* | (2006.01) |
| *C23C 8/32* | (2006.01) |
| *F16D 65/12* | (2006.01) |

(52) U.S. Cl.
CPC ...... *B23K 2101/34* (2018.08); *B23K 2103/02* (2018.08); *B23K 2103/04* (2018.08); *C21D 1/06* (2013.01); *C23C 8/32* (2013.01); *F16D 65/125* (2013.01); *F16D 2200/0013* (2013.01); *F16D 2200/0021* (2013.01); *F16D 2250/0046* (2013.01); *F16D 2250/0053* (2013.01)

(58) Field of Classification Search
CPC ............ B23K 2103/10; B23K 2103/15; B23K 2103/50; B23K 26/082; B23K 26/244; B23K 2101/34; B23K 2103/06; B23K 26/0876; B23K 2101/06; B23K 2101/32; B23K 2103/02; B23K 2103/05; B23K 2103/52; B23K 26/00; B23K 26/0006; B23K 26/0643; B23K 26/0665; B23K 26/144; B23K 26/22; B23K 26/322; B23K 26/323; B23K 26/354; B23K 26/40; B23K 26/60
USPC .................................................... 219/121.85
See application file for complete search history.

(56) References Cited

U.S. PATENT DOCUMENTS

| | | | | |
|---|---|---|---|---|
| 2019/0011004 A1* | 1/2019 | Mettrick | ............... | F16D 65/127 |
| 2020/0072307 A1* | 3/2020 | Rettig | .................. | C23C 28/021 |
| 2020/0101563 A1* | 4/2020 | Tao | ........................ | B23K 26/22 |
| 2020/0114469 A1* | 4/2020 | Tao | ...................... | B23K 26/244 |
| 2020/0171603 A1* | 6/2020 | Yang | .................... | B23K 26/244 |

FOREIGN PATENT DOCUMENTS

| | | | | |
|---|---|---|---|---|
| IT | 201800020773 A1 | 6/2020 | | |
| WO | 2012130455 A2 | 10/2012 | | |
| WO | WO-2013113853 A1 * | 8/2013 | ............ | B23K 26/34 |
| WO | 2021007209 A1 | 1/2021 | | |

* cited by examiner

6a)

6b)

7a)

7b)

METHOD TO PRODUCE HIGH CORROSION AND WEAR RESISTANT CAST IRON COMPONENTS BY USING LASER CLADDING

TECHNICAL BACKGROUND

The application of coatings or the use of surface modification treatments to modify properties of iron-based or steel components used for example in automotive industries, such as cast iron brake discs or sliding components in order to improve the wear and corrosion resistance is well known.

Some known deposition processes are for example thermal spraying, electroplating and laser cladding processes. Conventional laser cladding deposition processes are also called Laser Metal Deposition (LMD) or Directed Energy-Laser Beam (DED-LB). Apart from the conventional laser cladding processes there are also particular laser cladding processes such as High Speed Laser Cladding and Extreme High Speed Material Deposition, the last one also called Extreme High Speed Laser Application (EHLA).

Furthermore, other methods such as treatments for producing diffusion layers and/or oxidation layers by using for example gas or plasma nitrocarburizing processes and/or oxidation processes are also well known.

PROBLEM OF THE STATE OF THE ART

A big current challenge and requirement of the market nowadays is to produce components, in particular of the type brake discs, which allow a minimum fine dust emission and have longer life but which at the same time can be produced keeping the production costs as low as possible.

Cast iron is a well-known low-cost material that is used for brake disc due to its high melting point and capacity of heat storage, good conductivity, good castability and machinability. However, this material contains graphite material in form of lamellae and/or spherical particles/globules which are present at the surface of the component during the manufacture of the brake disc.

Unlike thermal spraying techniques, it is known that in laser material deposition techniques, such as conventional laser cladding techniques, an optics focused layer beam generates a melt pool via laser radiation on the surface of the component, powder or wire is fed into the melt pool via a nozzle and melts via a combination of melt pool temperature and laser radiation to add form and function. As the nozzle traverses the substrate, the heat source moves away and the deposited material solidifies and consolidates on with the substrate with a zone of dilution material (300 μm-1000 μm deep) between the substrate and deposit. Thereby a high energy molten pool is produced on the surface of the substrate (the substrate can be a part or component e.g. a brake disc) to be coated, in this manner coating material is deposited on a melt bed produced by the laser beam on the surface of the substrate. The coating material can be either melted completely or partially by the laser beam or deposited directly on the melt bed. It is also known that in the EHLA processes, the powder is fed into the line of the focused laser beam above the substrate. This ensures that the deposited material is already molten before making contact with the substrate, on the on the substrate a very shallow melt pool is still formed, allowing the deposited material to cool and solidify in contact with the underlying material, reducing the amount of heat reaching the component below and the depth of the dilution and heat effects. This small dilution forms the capability for producing much thinner coatings (20-300 μm) that achieve desired chemistry typically within 5-10 μm. This also forms the core of the high traverse speeds achievable with EHLA.

Consequently, by using laser cladding processes for coating iron-based substrate materials, such as cast iron, the graphite lamellae on the surface of the substrate are melted and even evaporated by the high power laser beam, which creates impurities in the coating itself and/or create voids or interruptions in the coating. In certain cases, the graphite lamellae can even "explode" during the coating process. This can lead to low adhesion zones or local defects, also formation of cracks in the coating structures, which reduces the adhesion of the coating. Moreover, the surface of the resulting coating is not flat but irregular, and exhibits an "orange skin" surface, this kind of coating surface has a negative effect, in particular for the specific application of brake discs.

The presence of graphite in form of lamellae and/or globules and/or martensitic structure is the cause of low process reliability which can limit the process windows to obtain high quality coatings.

Furthermore, areas of the substrate which cannot be coated by using laser cladding techniques (e.g. hub, swan neck inner diameter and/or ventilation or cooling channels) still expose the cast iron material of the substrate and can corrode easily in normal atmospheric condition, in particular with the presence of salts such as NaCl, KCl and MgCl2.

OBJECTIVE OF THE INVENTION

The main objective of the present invention is to provide a method to produce components, in particular brake discs made of iron-based materials such as cast iron or steel materials, with a surface exhibiting higher corrosion and wear resistance as compared with uncoated components belonging to the prior art.

A further objective of the present invention is to provide components, in particular of the type brake discs, which allow a minimum fine dust emission and have long life, and which preferably at the same time can be produced keeping the production costs as low as possible.

DESCRIPTION OF THE PRESENT INVENTION

The inventive method allows producing components, in particular brake discs exhibiting increased corrosion resistance, wherein materials and coating techniques are used, which additionally reduce the wear of the component.

The inventive method is a method to produce a wear and corrosion resistant coating system onto a surface of a substrate, the substrate or at least said surface of the substrate being made of a substrate material of the type iron-based material or steel material, said coating system comprising one or more coating layers, wherein the method comprises following steps:

(1) Providing the substrate having the surface to be coated with the coating system, (2) Selecting a dedicated material (in the context of the present description also referred to as dedicated coating material) for producing one or more coating layers of the coating system.

(3) Producing onto the substrate surface to be coated one or more coating layers of the coating system by using a laser cladding process, wherein the dedicated material selected in step (2) is used as source material for the production of the coating layers, wherein, for conducting step (3) a laser beam is positioned with respect to the substrate surface to be coated in such a manner that an angle between the laser beam and an axis is formed, wherein the axis is perpendicular to the substrate surface to be coated, and this angle called coating angle is maintained during the production of the one or more coating layers at a value from 10° up to 45°, preferably from 10° up to 30°.

The use of the method described above, in particular the use of coating angles in the above mentioned ranges, allows attaining increased weldability of the substrate material, using increased laser power levels, attaining increased deposition rates, attaining increased adhesion of the one or more coating layers to the substrate surface on which the coating system is deposited.

Preferably the substrate is a component used in the automotive industry, in particular brake discs.

Preferably if the component is a brake disc, the brake disc is made of a cast iron material or comprises at least a surface made of a cast iron material on which the coating system is deposited according to the present invention.

The laser cladding process can be a conventional laser cladding process or any other particular variant of a laser cladding process.

The laser cladding process is preferably a EHLA process.

The inventive method can be conducted for coating of brake discs according to a preferred embodiment of the present invention in such a manner that the laser cladding process in step (3) is conducted by implementation of higher laser power levels, for example in a range from 5 KW up to 30 KW, preferably in a range from a value higher than 5 KW up to 30 KW. More preferably in a range from 10 KW up to 30 KW or in a range from 10 KW up to 25 KW. This becomes possible by using coating angles in the above mentioned coating angle ranges.

The inventive method can be conducted for coating of brake discs according to a further preferred embodiment of the present invention in such a manner that the laser cladding process in step (3) is conducted by implementation of process speeds in a very broad range of high deposition rates, including higher process speeds as compared to the state of the art, for example in a range from 50 m/min up to 200 m/min. In the case of using high process speeds, preferably in a range from 100 m/min up to 200 m/min, more preferably in a range from 100 m/min up to 150 m/min because in this range more stable processes are attained. This becomes possible by using the inventive method including coating angles in the above mentioned coating angle ranges.

The inventive method can be conducted for coating of brake discs according to a further preferred embodiment of the present invention in such a manner that the laser cladding process in step (3) is conducted by selecting the process parameters in the ranges mentioned above in such a manner that a very wide of coating deposition rates, including high coating deposition rates are attained. Deposition rate higher than 500 $cm^2$/min is considered a high deposition rate. The inventive method is preferably carried out by selecting the process parameter for attaining high deposition rates in a range from 500 $cm^2$/min up to 1200 $cm^2$/min.

The embodiments or preferred embodiments of the present invention an the examples of the present invention in the present description should not be understood as a limitation of the present invention but as information for better understanding the present invention.

Each embodiment or preferred embodiment of the present invention can be combined with one or more embodiments or preferred embodiments.

The present invention constitutes a considerably and unexpected big advantage for coating of brake discs because the inventive method makes it possible to expand the process parameters (to attain an "Expanded Process Parameter Window") for brake disc coating process, even meeting all the requirement like weldability, desired thickness, porosity and cracking in the brake disc coating process.

The inventors suggest furthermore to further improve weldability of the substrate material, in particular of cast iron material, to conduct a pre-treatment process before depositing the laser cladding coating layers, preferably pre-treatment process comprising an step, in which graphite, in particular graphite lamellae are reduced or removed from the substrate surface for increasing weldability of the substrate material. Preferably, the pre-treatment process involves surface activation of the substrate material by using a pulsed fluid jet process, preferably a water jet process.

The coating system can be formed comprising only one coating layer produced by using laser cladding (i.e. comprising a laser cladding monolayer coating), or even consisting of only one coating layer produced by using laser cladding (i.e. consisting of a laser cladding monolayer coating).

The coating system can be however also formed comprising two or more coating layers produced by using laser cladding (i.e. comprising a laser cladding multilayer coating), or even consisting of two or more coating layers produced by using laser cladding (i.e. consisting of a layer cladding multilayer coating).

The term monolayer coating in the context of the present invention is used for referring to the deposition or formation of one singular kind of coating layer. The singular kind of coating layer can be deposited in one or more runs, wherein one run corresponds to one coating deposition run with the laser. Therefore, in the context of the present description the monolayer coating can be deposited in one or more runs in other to attain the desired coating layer thickness.

The term multilayer coating in the context of the present invention is used for referring to the deposition or formation of more than one coating layer, each one being a different kind of coating layer, it means for example that they can differ in the general average composition. Each type of coating layer can be deposited in one or more runs, wherein one run corresponds to one coating deposition run with the laser. Therefore, in this context each one of the different types of coating layers can be deposited in one or more runs in other to attain the desired coating layer thicknesses.

In order to protect the uncoated areas from the corrosion, the method according to the present invention can be conducted including a post-treatment process executed after conducting the step (3), the post-treatment process comprising a step in which a diffusion layer is produced by using a nitrocarburizing process.

The diffusion layer mentioned above can be also produced by using a combined process including a nitrocarburizing process (also referred to as nitrocarbiding process) followed by an oxidation process (also referred to as oxidizing process). Such a combined process can be for example one of the processes for producing corrosion and wear protection layers disclosed by Hoppe in EP 0753599 A1, respectively in EP 0753599 B1. These processes are not conducted for producing changes in the coating but only for increasing corrosion resistance of the material in the uncoated parts of the substrate, e.g. in the cooling channels of a brake disc, inner and outer diameter, bell and swan neck.

As described above one possibility of improvement of the weldability of the substrate material before deposition of a laser cladding coating layer can be attained by removing graphite from the substrate surface, in particular it can be beneficial that the lamellae and/or graphite are removed from the surface of the cast iron by means of a surface pre-treatment process, in particular a water jet process, preferably with an additional pulsation of the water jet. The water jet process, when using specific parameters, has the particularity to allow the removal of the graphite lamellae.

The complete or partial removal of the graphite from the surface improves the weldability of the substrate material (in the context of the present description substrate material is also called base material) and the "base-material-laser interaction", which improves the adhesion of the coating on the substrate. In addition it reduces the porosity level and risk of cracking in the coating structure.

As explained above, the use of this method also allows to broaden the possible process parameter window for the deposition, which makes the process more robust. Due to the coating angle, implementation of higher laser power levels (e.g. 10-25 KW) becomes possible and consequently higher process speeds (e.g. 100-200 m/min), i.e. the relative movement of the laser beam over the substrate can be increased accordingly. Moreover, as also explained above, the higher deposition speeds, allows to reduce the cycle time and consequently increasing the deposition rates (e.g. 500-1200 $cm^2$/min) during serial production. The higher deposition rate also gives more freedom in the selection of the composition for the coating material.

The present invention allows that laser cladding processes can be optimized for coating of brake discs in such a way that the weldability and coating properties are improved by the combination of specific process parameters such as deposition angle, laser spot size, laser power, powder feed rate, surface speed and dedicated coating materials.

In the context of the present description of the present invention, a dedicated material, (also called dedicated coating material) is in particular a material that can be used for producing a coating by using laser cladding coating techniques, preferably EHLA, the being able to provide an improved performance to the substrate surface which is being coated, in particular for improving corrosion and wear resistance of brake discs. Hence, a dedicated material is selected having properties that allows attaining the desired performance of the brake disc during its use, when the material is applied as coating. In other words, the dedicated material is preferably selected for improving performance of brake discs, therefore for attaining good adhesion to the substrate surface to be coated (e.g. the substrate surface can be for instance cast iron), good corrosion resistance, good wear resistance, good thermal shock resistance, good crack resistance and high material stability under all the typical brake disc usage condition, such as high thermomechanical stress, wet and dry conditions and interaction with a braking pad material). Examples of such dedicated materials are the alloy materials mentioned by Vecchio et al. in WO 2021/007209 A1.

As mentioned above, in a preferred embodiment, the process parameters are characterized by positioning the laser beam at a certain angle (coating angle) with respect to a perpendicular to the surface of the substrate during the coating process. This allows to reduce the heat load of the hot spot on the surface of the substrate, reducing the effect of the high energy laser beam on the graphite lamellae that are present on the surface of the substrate. In a more specific embodiment, the coating angle is set in such a way that the laser beam is not hitting the graphite lamellae on the surface. Thus reducing the effect of a possible evaporation or removal during the coating process. For this type of coating process configuration, high deposition rates (e.g. 500-1200 $cm^2$/min) and dedicated coating material (as mentioned above) with high deposition efficiency (≥90%) can be used which allows to reduce considerably the coating cycle time. Preferred coating angles between the laser beam and the perpendicular to the surface of the substrate are set between 1° and 30°.

As mentioned above, according to some preferred embodiments of the present invention it is possible to conduct methods comprising a combination of the laser cladding coating techniques and gas or plasma nitriding and/or nitrocarburizing processes, optionally followed by a post oxidation (e.g. a combined process as disclosed by Hoppe in EP 0753599 A1, respectively in EP 0753599 B1) for improving corrosion resistance of the uncoated parts (e.g. ventilation channels or cooling channels) which cannot be coated by laser cladding.

Since nitrocarburization and oxidation processes are usually conducted in a process chamber comprising gas or plasma for applying the corresponding treatment to substrates comprised in the chamber, every part of the surface of a substrate contained in the process chamber and being exposed to a corresponding gas or plasma can be processed, in particular for brake discs, holes, grooves or ventilation chambers can be processed. The particular nitrocarburization+oxidation process provides the formation of 3 different layers: oxide layer, white layer and diffusion layer, as it is shown in one of the examples below.

In one general example, the inventive method comprises:

- Providing a finished cast iron brake disc, namely a component which is casted, machined and fine turned
- Reducing or removing graphite lamellae through a water jet process
- Providing a coating made of a single layer or multilayer by a laser material deposition technique, such as laser cladding, High Speed Laser Cladding or Extreme High Speed Laser Application (EHLA)—the last one also called Extreme High Speed Material Deposition (EHLA)
- The coating is produced using a specific laser cladding deposition technique which consists of using a specific coating angle between 10° and 30°
- Using a dedicated material to fulfill the combination of the coating technique and coating properties. Preferred is that a single layer meets all the technical requirement (wear, corrosion and cracking resistance)
- Optionally grinding the surface of the coated brake disc, in order to obtain the required geometrical tolerances One further particular example of the inventive method is a method to produce a corrosion resistant coating system onto a cast iron substrate, wherein the coating system comprises at least a laser cladding top layer, wherein prior to applying the top layer the surface of the substrate is mechanically activated by a pulsed fluid jet process in order to reduce or remove the graphite lamellae, wherein the substrate including the laser cladding top layer is treated to produce at least a nitrocarburizing diffusion layer into the uncoated areas of the substrate.

DESCRIPTION OF THE FIGURES

FIG. 3*a*) shows the substrate surface with the coating just after deposition of the coating, without being subjected to any subsequent process; FIG. 3*b*) shows the same coated substrate shown in FIG. 3*a* but after grinding; FIG. 3*c*) shows a brake disc of cast iron coated according to the present invention, with one laser cladding coating deposited as monolayer by using a EHLA process, wherein for producing the coating as dedicated material a Metco®Brake powder was used; 3*d*) shows an augmentation of the picture of the coating shown in FIG. 3*c*), in which the very uniform hard-phase distribution in the coating structure can be observed.

Figure 1:
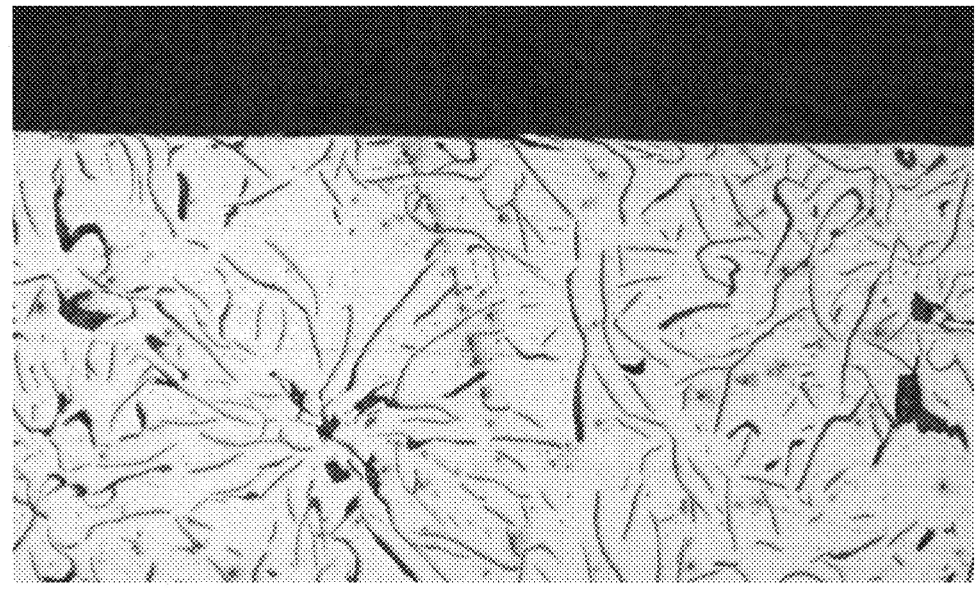
FIG. 1 shows a brake disc of cast iron without any coating. The brake disc surface is therefore significantly exposed to corrosion, wear and consequently fine dust emissions during the performance. For these reasons, a coating solution is recommendable needed to reduce the corrosion and wear and to prolong the lifetime of the brake disc part
Figure 2:
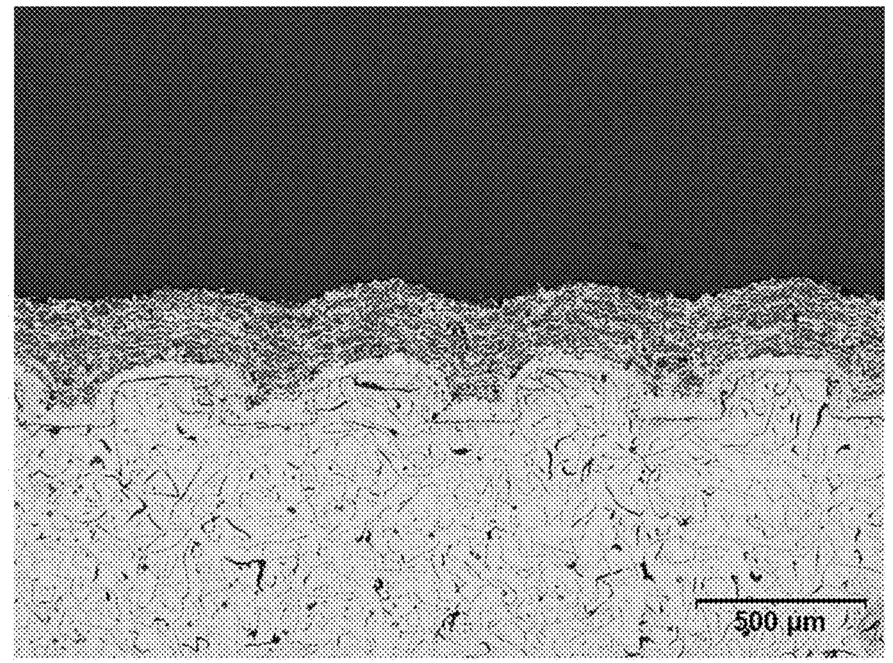
FIG. 2 shows a brake disc of cast iron with a thermal spray coating. The process efficiency is less than 50% and the coating system is complex. Rough surface activation is needed to achieve acceptable adhesion between coating and substrate since in contrast to laser cladding there is no metallurgical bonding in thermal spray process. Laser cladding has two major advantages compared to thermal spray: 1. Process efficiency higher than 90% in laser cladding and 2. Metallurgical bonding between coating and substrate in laser cladding guarantees the enough bond strength of the coating and cast iron
Figure 3:
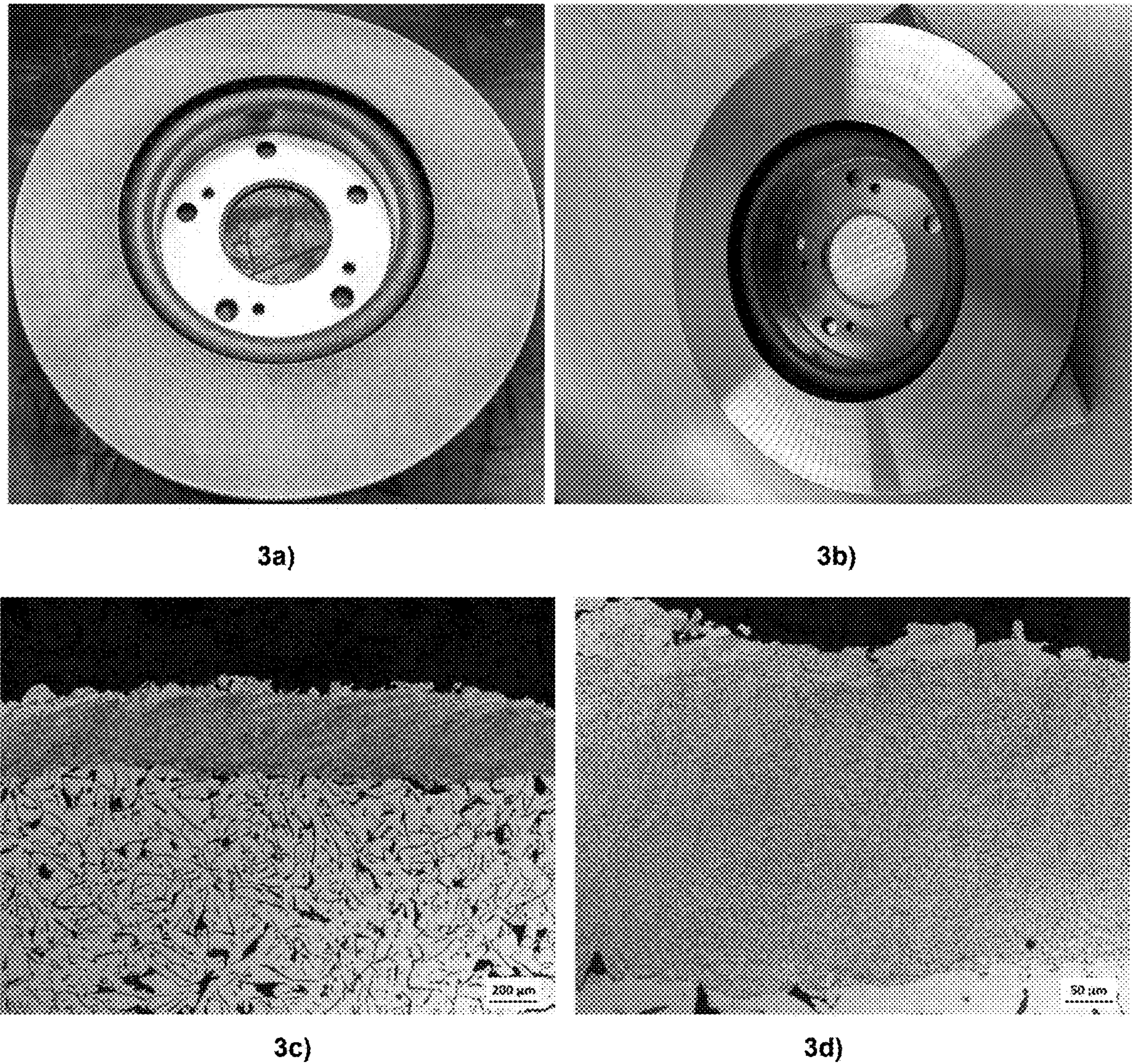
FIG. 3 shows a brake disc of cast iron with one laser cladding coating deposited as monolayer by using a EHLA process, without pre-treatment and also without post treatment.
Figure 4:
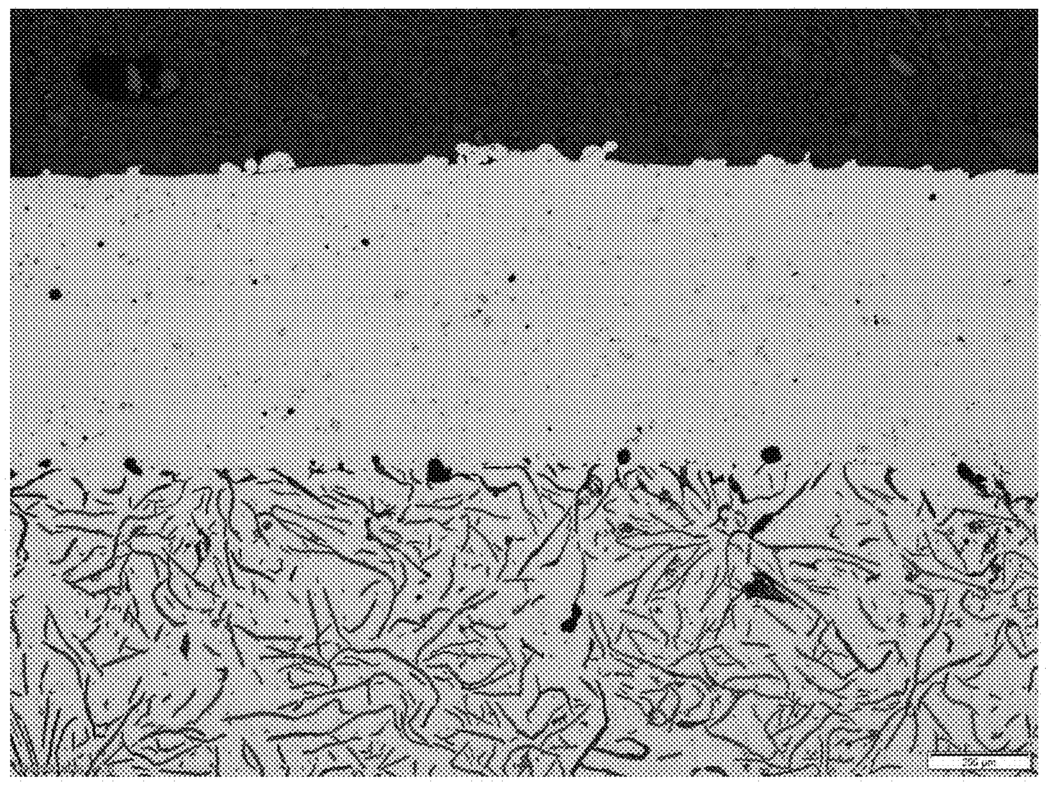
FIG. 4 shows a brake disc of cast iron coated according to the present invention with one laser cladding coating deposited in multiple runs, without pre-treatment and also without post treatment.
Figure 5:
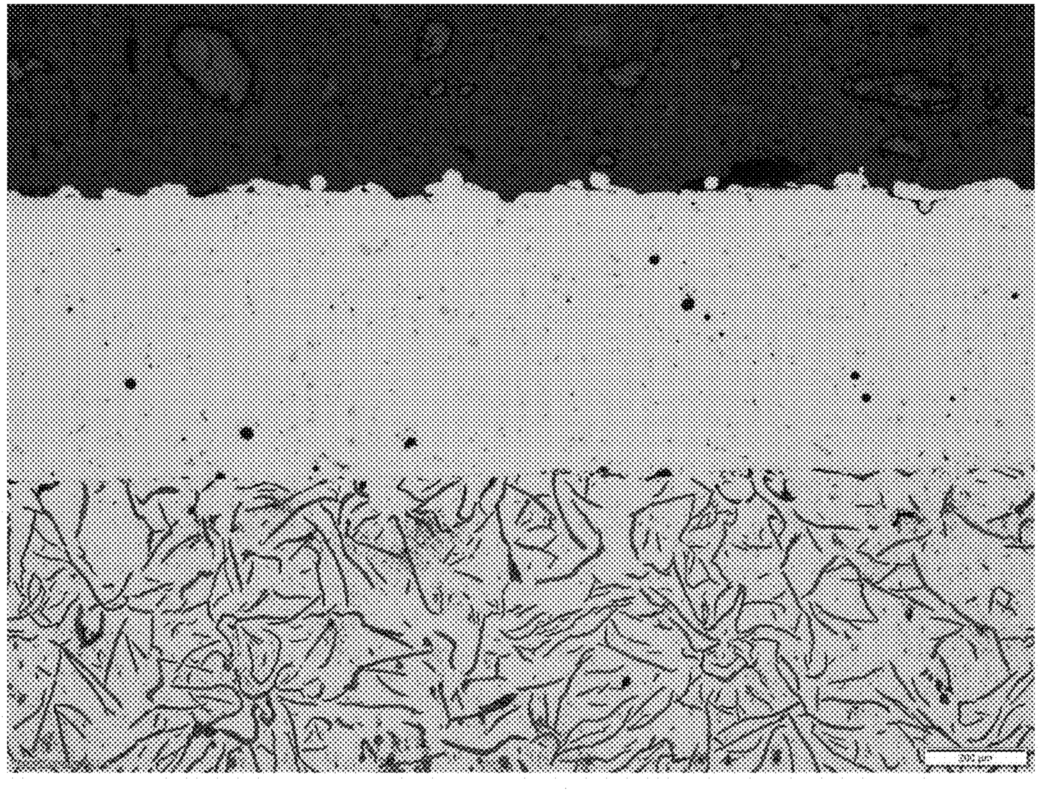
FIG. 5 shows a brake disc of cast iron coated according to the present invention with one laser cladding coating deposited in multiple runs with pre-treatment. Interface quality has been significantly improved due to reduction of graphite lamellas by pre-treatment.
Figure 6:
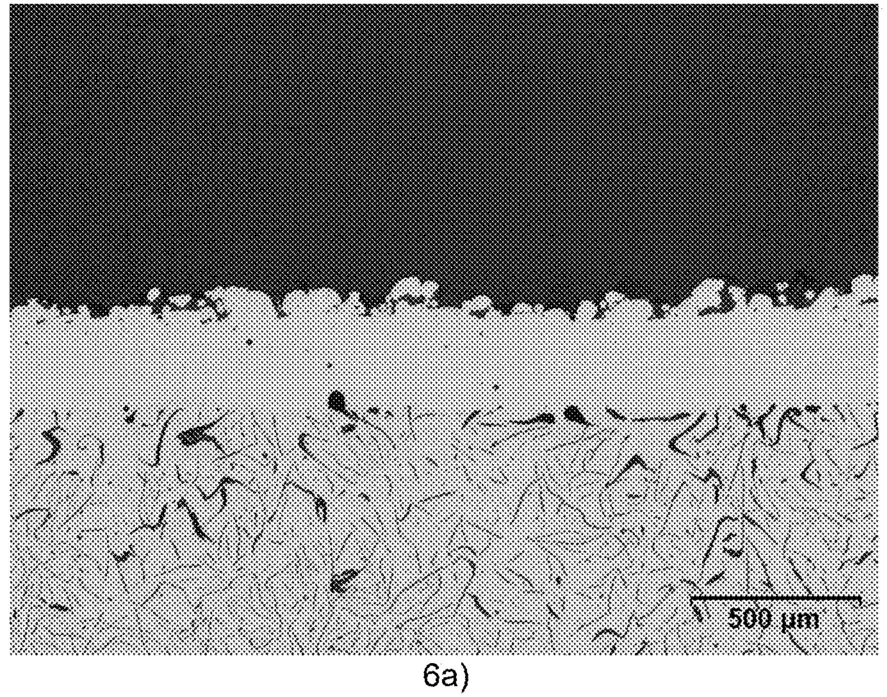
FIG. 6 shows a brake disc of cast iron deposited according to the present invention, with one laser cladding coating deposited as monolayer in one run, wherein a posttreatment was conducted after coating deposition; 6*a*) shows the substrate surface coated and post-treated; 6*b*) shows the substrate surface that during coating could not be coated but which was modified during post-treatment, 3 different layers were formed: one oxide layer, one white layer and one diffusion layer, these three layers were formed in the cast iron uncoated substrate surface due to the post-processing to protect the uncoated areas such as ventilation channels.
Figure 6:
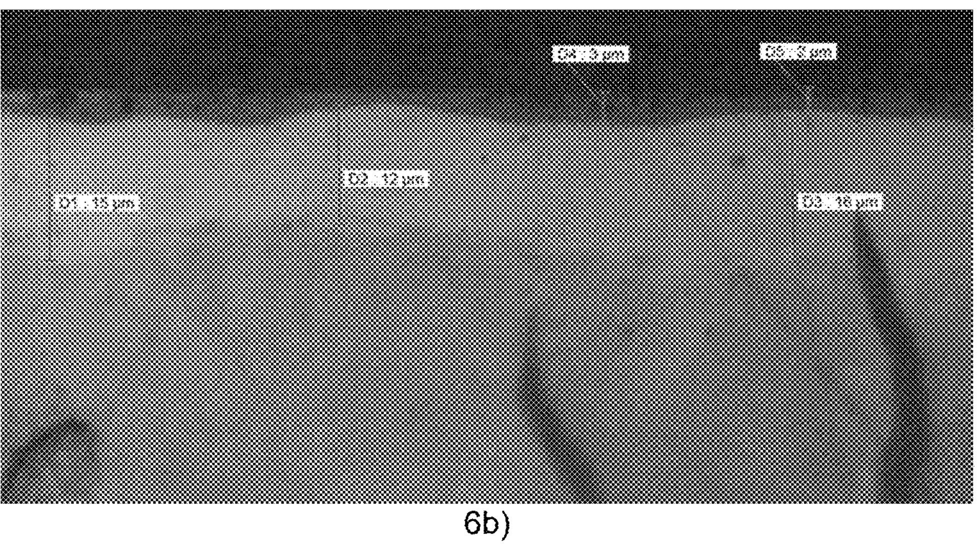
Figure 7:
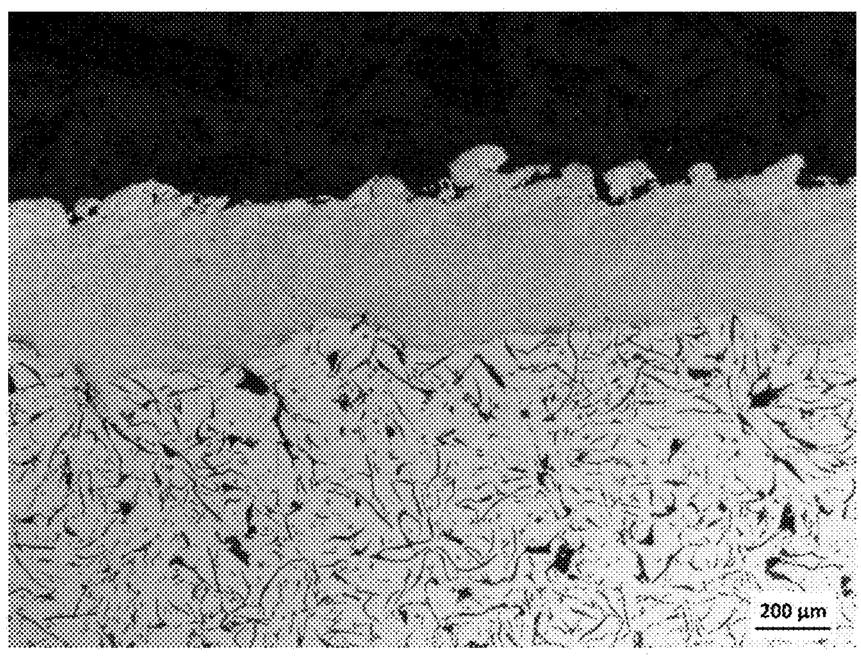
FIG. 7 shows a brake disc of cast iron deposited according to the present invention, with one laser cladding coating deposited as monolayer in multiple runs one run, wherein a pretreatment and a posttreatment was conducted previous to coating deposition; 6*a*) shows the substrate surface coated and a reduction of graphite lamellas at the interface can be observed; 6*b*) shows the substrate surface that during coating could not be coated but which was modified during post-treatment, 3 different layers were formed: one oxide layer, one white layer and one diffusion layer, these three layers were formed in the cast iron uncoated substrate surface due to the post-processing to protect the uncoated areas such as ventilation channels.
Figure 7:
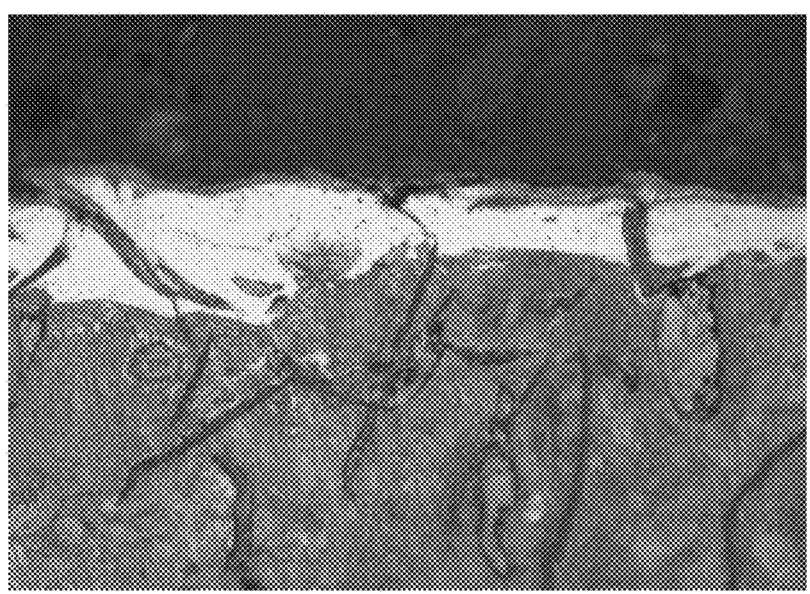

Break discs of cast iron were deposited with methods according to the present invention.

In some inventive examples, brake discs of cast iron were coated with monolayers laser cladding coatings having total coating layer thickness in a range between 150 to 500 μm, the porosity according to ASTM E2109-01 was ≤0.5%, the average microhardness was about 350 HV, the deposition efficiency by using a EHLA process with process parameters in the inventive ranges was ≥90%, the wear life (AK master) was increased attaining a wear life higher than uncoated gray iron brake discs in more than 10-times, the corrosion resistance (ASTM B117) was ≥1000 h. In some of these examples as dedicated material a Metco®Brake powder was used.

The invention claimed is:

1. A method to produce a wear and corrosion resistant coating system onto a surface of a brake disc, the method comprising the following steps:

(1) providing the brake disc having the surface to be coated with a coating system, (2) selecting a dedicated material for producing one or more coating layers of the coating system, (3) producing onto the brake disc surface to be coated one or more coating layers of the coating system by using a laser cladding process, wherein the dedicated material selected in step (2) is used as a source material for the production of the coating layers, wherein for conducting step (3) a laser beam is positioned with respect to the brake disc surface to be coated in such a manner that an angle is formed between the laser beam and an axis perpendicular to the brake disc surface to be coated, and this angle is called a coating angle, and the coating angle is maintained during the production of the one or more coating layers at a value between 10° and 30°, and wherein the brake disc or at least the surface of the brake disc is made of an iron-based material or a steel material and wherein the dedicated material is fed into the laser beam above the brake disc, and wherein the coating system has a total thickness between 150 and 500 μm, a porosity according to ASTM E2109-09≤0.5% and average microhardness of 305 HV.

2. The method according to claim 1, wherein the brake disc material is a cast iron material.

3. The method according to claim 2, wherein before conducting the step (3), a pre-treatment process is conducted, said pre-treatment process comprising a step in which graphite lamellae are reduced or removed from the brake disc for increasing weldability of the brake disc material.

4. The method according to claim 3, wherein the pre-treatment process involves surface activation of the brake disc material by using a pulsed fluid jet process.

5. The method according to claim 1, wherein the laser cladding process in step (3) is conducted by implementation of high laser power levels which are in a range between 10 KW and 30 kW.

6. The method according to claim 1, wherein the laser cladding process in step (3) is conducted by using high process speeds which are in a range between 100 m/min and 200 m/min.

7. The method according to claim 1, wherein the laser cladding process in step (3) is conducted by depositing the selected material at a deposition rate between 500 $cm^2$/min and 1200 $cm^2$/min.

8. The method according to claim 1, wherein the coating system comprises only one coating layer produced by using laser cladding.

9. The method according to claim 8, wherein the coating system consists of the only one coating layer produced by using laser cladding.

10. The method according to claim 1, wherein the coating system comprises two or more coating layers produced by using laser cladding.

11. The method according to claim 10, wherein the coating system consists of the two or more coating layers produced by using laser cladding.

12. The method according to claim 1, wherein after conducting the step (3), a post-treatment process is conducted, said post-treatment process comprising using a nitrocarburizing process to produce a diffusion layer on the brake disc, in order to protect uncoated surfaces of the brake disc.

13. The method according to claim 1, wherein after conducting the step (3), a post-treatment process is conducted, said post-treatment process comprising using a nitrocarburizing process and an oxidation process to produce at least one diffusion layer and at least one oxidation layer on the brake disc in order to improve corrosion and wear resistance of uncoated surfaces of the brake disc.

* * * * *